United States Patent [19]

Biggs

[11] Patent Number: 5,115,125
[45] Date of Patent: May 19, 1992

[54] PIN DETECTION SYSTEM WITH AN ADJUSTABLY-MOUNTED ARRAY OF SENSORS

[76] Inventor: Ross O. Biggs, P.O. Box 145, Tweed Heads, New South Wales 2485, Australia

[21] Appl. No.: 746,976

[22] Filed: Aug. 19, 1991

Related U.S. Application Data

[62] Division of Ser. No. 520,194, May 9, 1990, abandoned.

[30] Foreign Application Priority Data

May 9, 1989 [AU] Australia ............................. PJ4081

[51] Int. Cl.⁵ .............................................. G01V 9/04
[52] U.S. Cl. .................................. 250/222.1; 250/239; 273/54 E
[58] Field of Search ............... 250/222.1, 208.1, 208.2, 250/239; 273/54 E, 54 C

[56] References Cited

U.S. PATENT DOCUMENTS

| | | |
|---|---|---|
| 3,825,749 | 7/1984 | Gautraud et al. |
| 4,581,657 | 4/1986 | Takano ................. 250/239 |
| 4,726,587 | 2/1988 | Fitch . |
| 4,859,847 | 8/1989 | Matsuno et al. ........ 250/239 |
| 4,988,858 | 1/1991 | Pinson .................. 250/208.1 |
| 5,049,741 | 9/1991 | Fukuda et al. .......... 250/239 |

Primary Examiner—David C. Nelms
Assistant Examiner—Que T. Le
Attorney, Agent, or Firm—Hoffman, Wasson & Gitler

[57] ABSTRACT

A system for detecting pins of ten pin bowling apparatus including a lens for receiving light reflected from standing pins and a linear light sensitive array for receiving light from the lens. A microcontroller is provided for controlling operation of the system and serves to provide a serial output corresponding to the level of light reflected from said pins. A housing is mounted between a pair of lanes, the housing carrying the lens and array which is adjustably mounted relative to the lens. A visual display may be provided to enable the array to be set up to receive similar light signals from each lane.

19 Claims, 5 Drawing Sheets

PIN DETECTION SYSTEM WITH AN ADJUSTABLY-MOUNTED ARRAY OF SENSORS

This is a divisional of copending application Ser. No. 07/520,194 filed on May 9, 1990, now abandoned.

FIELD OF THE INVENTION

This invention relates to a detection system which is particularly applicable to usage in ten pin bowling apparatus for detecting the presence or absence of ten pin bowling pins.

DESCRIPTION OF THE RELATED ART

A number of different methods are currently employed for detecting pins in ten pin bowling apparatus. Such methods may include the provision of switches which may be actuated in response to movement of pin gripping jaws. Other systems have involved the use of light detecting devices wherein a light beam is interrupted by the presence or absence of a standing pin whilst other arrangements employ acoustics such that reflected signals from standing pins can be detected. Other detection systems have employed the principle of sensing reflected light however generally such systems incorporate an external light source to generate a light beam incident on the bowling pins and furthermore such systems are usually triggered by a photoelectric switch or switch on the back cushion to sense the bowling ball.

SUMMARY OF THE INVENTION

The present invention aims to provide a detection system for ten pin bowling apparatus which can automatically detect the number of pins knocked down after each ball is delivered and provides an output for use in a computerized ten pin bowling scoring system. The present invention also aims to provide a system which may sense the presence or absence of bowling pins in a pair of adjacent lanes. Whilst the present invention is particularly applicable to usage in ten pin bowling apparatus it may also be readily applied to the detection of other objects or devices such as in work piece processing systems.

With the above and other objects in view the present invention provides a detection system comprising a linear array of photosensitive devices, lens means arranged to project light onto said array, said array providing a serial output corresponding to the level of light reflected from an object within the field of view of said lens means and means associated with said linear array providing an output dependent upon the presence or absence of an object in said field of view of said lens means.

Suitably the system is associated with ten pin bowling apparatus and the field of view of the lens is sufficient to extend to all pins which may be standing on a pair of adjacent bowling lanes.

Preferably the operation of the array is controlled by microcontroller means which also serves to digitize the voltage signal provided by the array and provide a serial digital output which can be read by a scoring system.

Preferably the microcontroller is triggered to interpret standing pins on a pin deck by switch means associated with a ten pin bowling machine and also to respond to a foul.

The present invention also provides a system incorporating a sensing head for sensing standing pins in ten pin bowling apparatus, said sensing head including a housing, lens means supported on said housing for receiving light reflected from said standing pins and a linear array of photo sensitive devices supported in said housing rearwardly of said lens means to receive said reflected light through said lens means and bracket means for supporting said linear array for movement within said housing, said bracket means being adjustably supported in said housing whereby to permit variation of the position of said array relative to said lens means to thereby vary the incidence of reflected light on said array.

Preferably said bracket means supports said linear array for movement in a vertical direction and pivotal movement about a horizontal axis. The bracket means further preferably supports said array for pivotal movement about a substantially vertical axis. Suitably said bracket means includes a first bracket supported in said housing for movement in a substantially vertical direction, and a second bracket pivotally supported on said first bracket for pivotal movement about a substantially horizontal axis and wherein said liner array is supported on said second bracket.

Preferably also said brackets are apertured to permit the passage of light therethrough from said lens means to said array. Suitably said aperture in said first bracket is surrounded by a boss and wherein said aperture in said second bracket is in bearing engagement with said boss whereby to define said pivotal support of said second bracket on said first bracket.

The present invention also provides a method of setting up a sensing head of the above described type for detecting standing pins of ten pin bowling apparatus.

BRIEF DESCRIPTION OF THE DRAWINGS

In order that the invention may be more readily understood and put into practical effect reference will now be made to the accompanying drawings which illustrate a preferred embodiment of the invention and wherein.

DETAILED DESCRIPTION OF THE INVENTION

Figure 1:
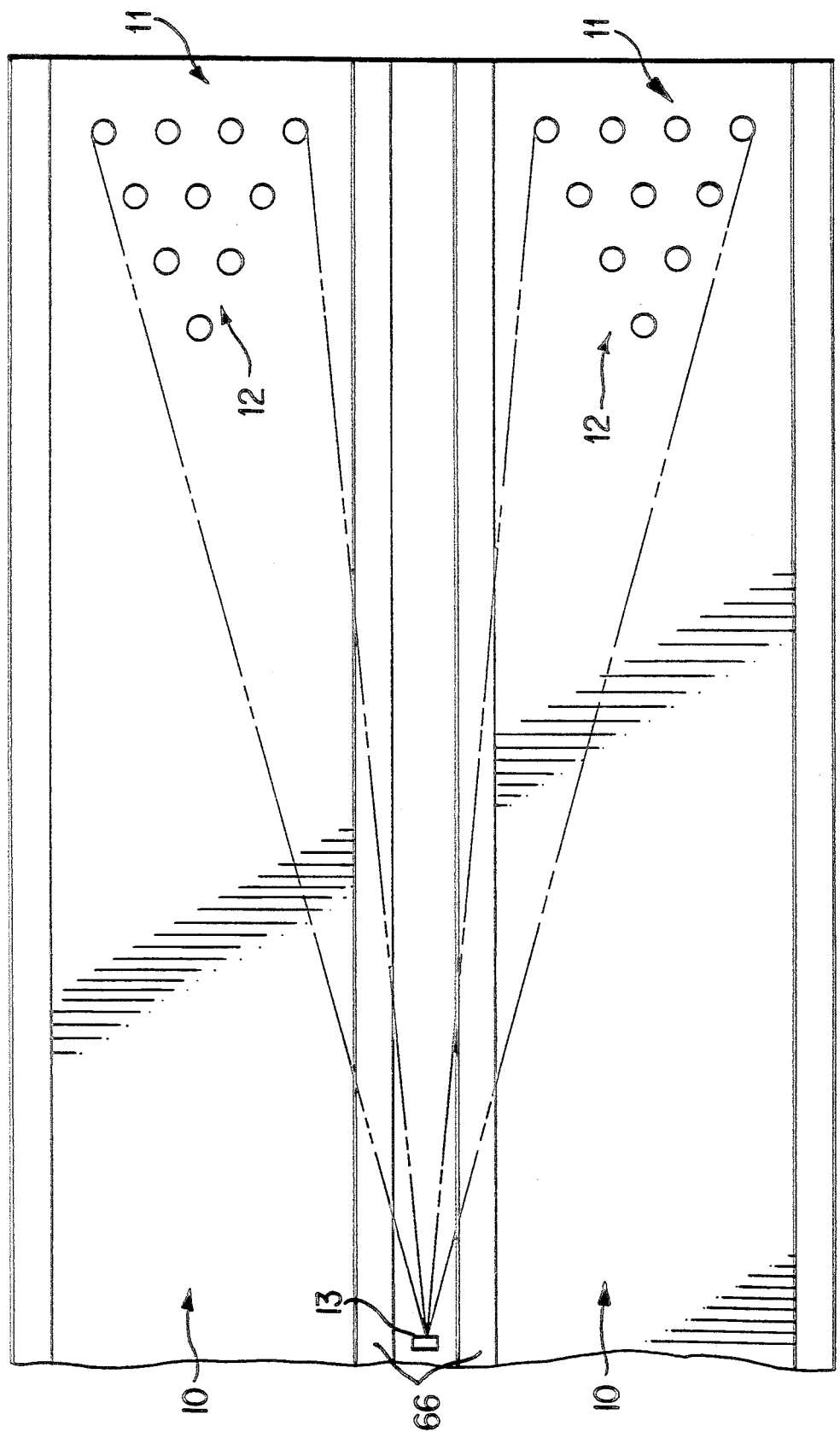
FIG. 1 is a plan view illustrating a pair of adjacent ten pin bowling lanes associated with the system of the present invention.
Figure 2:
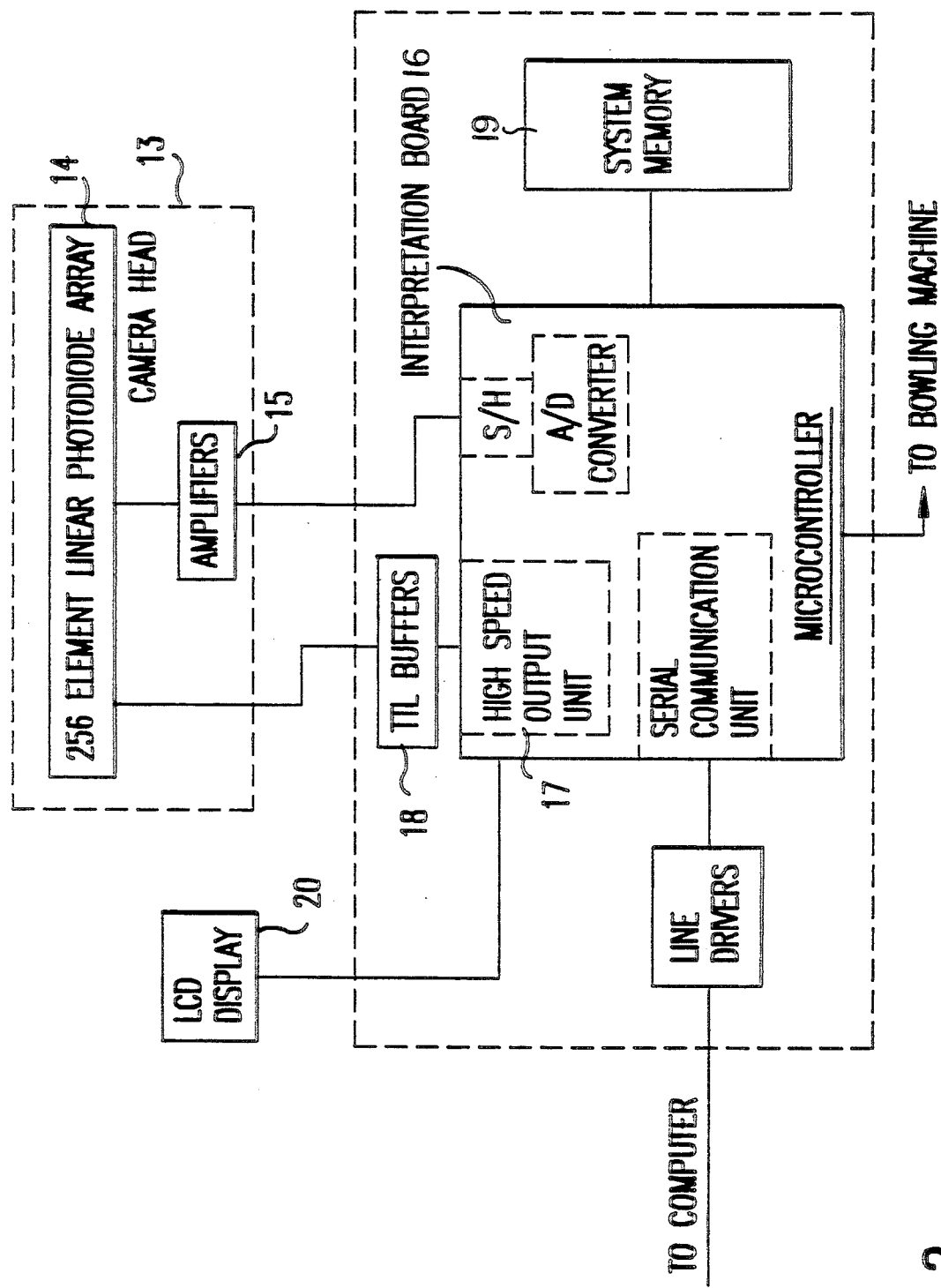
FIG. 2 is a block diagram of the system according to the present invention.

Referring to the drawings and firstly to FIGS. 1 and 2 there is illustrated a pair of side by side bowling lanes 10 terminating in a pin deck 11 upon which respective sets 12 of ten pins may stand so as to be in the path of bowling balls delivered down the lanes 10. The pin detection system of the present invention comprises an optical sensing head 13 including a wide angle lens (not shown) arranged forwardly of, to direct light to a linear photodiode array 14 preferably comprising 256 elements.

Figure 3:
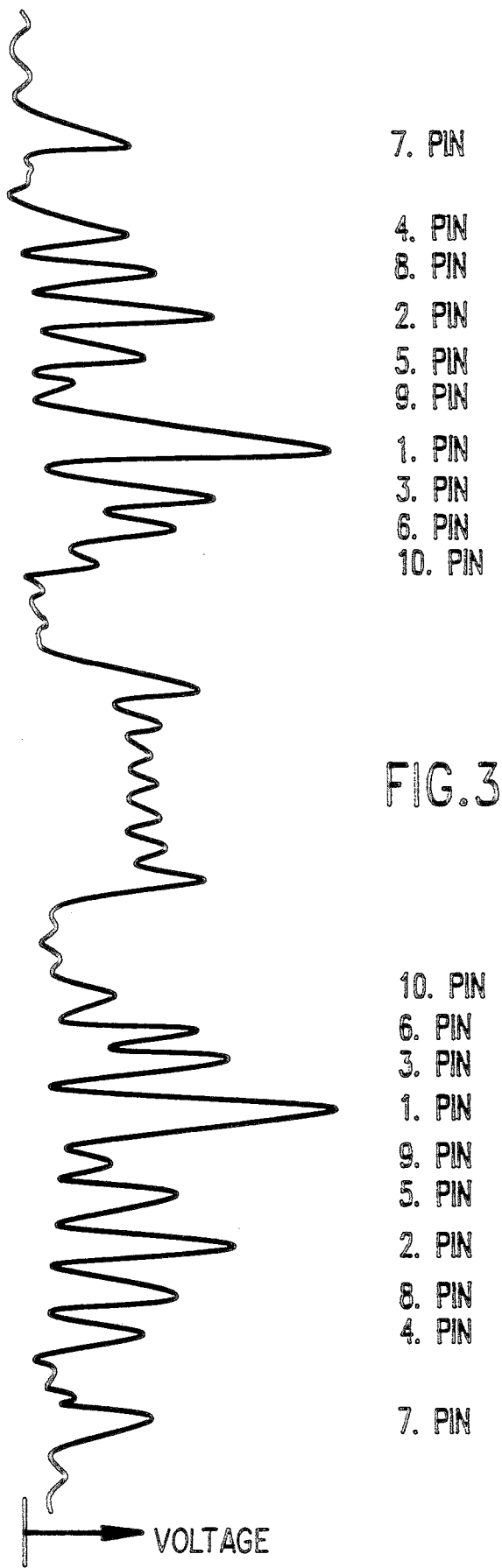
FIG. 3 illustrates the typical voltage signals generated by the array.

The lens, which suitably comprises a video industry standard "C" mount wide angle 8 mm lens compatible with a ⅔" video camera tube, has a field of view which as shown in FIG. 1 extends to all pins standing on the adjacent lanes 10 and pin decks 11 so that the pins left standing on each pin deck 11 can be scanned. The lens is preferably arranged in a position such that the linear array 14 senses reflected light from approximately 15 mm of the neck of each pin. Thus the signal emitted by the array 14 is related to the level of light reflected from an approximate 15 mm high horizontal line or band stretching across a pair of bowling lanes. FIG. 3 shows typical voltage levels generated by the array in viewing the pins on the adjacent pin decks 12 with the peaks as indicated indicating the presence of each pin and it will be apparent that the absence of such peaks will indicate an absence of such pins on the pin deck 12.

FIG. 2 is a block diagram of the preferred circuit for controlling operation of the array 14 and processing the signal generated by the array 14. As shown, the array 14 provides an output to amplifiers 15 which provide an amplified signal to a microcontroller 16 which suitably comprises an Intel type 8097BH. The microcontroller 16 also controls the operation of the array 14 through a high speed output section 17 and suitable buffers 18, the output of which controls the start, clock and recharge signals of the array 14. The clock speed as determined by the microcontroller 16 sets the time between accessing the different elements in the array 14.

After the microcontroller 16 applies a start pulse to the array 14, the array 14 will output sequentially a voltage proportional to the light incident upon each element in the array and a sequential output of voltages will occur between the start pulses applied by the microcontroller 16. This voltage output of each element of the array 14 is amplified by the amplifiers 15 and inputted into the microcontroller 16 where the voltage level is sampled and held for analogue to digital conversion and the resulting digital number representative of the voltage level at each element is stored in a system memory 19. The array element from which the voltage signal is taken is recharged after the voltage information is sent back to the microcontroller 16 so that the element is in a state to sense the light level for the next period and the process under control of the clock is repeated for the next and following elements.

The resultant composite signal after one start period comprises a list of digital numbers in the system memory 19 which describes the light that was incident on the array elements and which is therefore representative of the light reflected from the standing pins. This list of numbers is then examined by the microcontroller 16 which interprets the number of pins left standing. The algorithm used for interpreting the voltage signal counts the voltage peaks which are representative of the pins left standing as the standing pins reflect more light than the pinspotter pit.

After the microcontroller 16 has determined the pin count, the count is transmitted via a serial port in the microcontroller 16 to the bowling scoring system computer or lane terminal where the pin count is analyzed to provide a score and details of the pins remaining which may be visually displayed.

The system is triggered to interpret the standing pins automatically in response to operation of the bowling machine. For this purpose, the bowling machine may be provided with a switch or switches which sense the passage of a ball along the pin deck for example by photoelectric means. Alternatively, the bowling machine may include a switch such as a microswitch which senses when the ball strikes the pin cushion. Many bowling machines already incorporate such switches as described above for controlling machine operation. Thus whilst the sensing head 13 is continuously receiving reflected light from the standing pins, the microcontroller 16 will only generate signal at its serial output a period of time to account for pin wobble after actuation of the switch as above. This time delay can be varied as desired.

So as to enable set up of the apparatus, a liquid crystal display 20 may be connected to the microcontroller 16 so as to provide a visual image of the light reflected by the pins in the respective lanes, the image being of the general form as that shown in FIG. 3. This display 20 is used in conjunction with the sensing head as described below to set up the apparatus to accurately operate on a pair of adjacent lanes.

Figure 4:
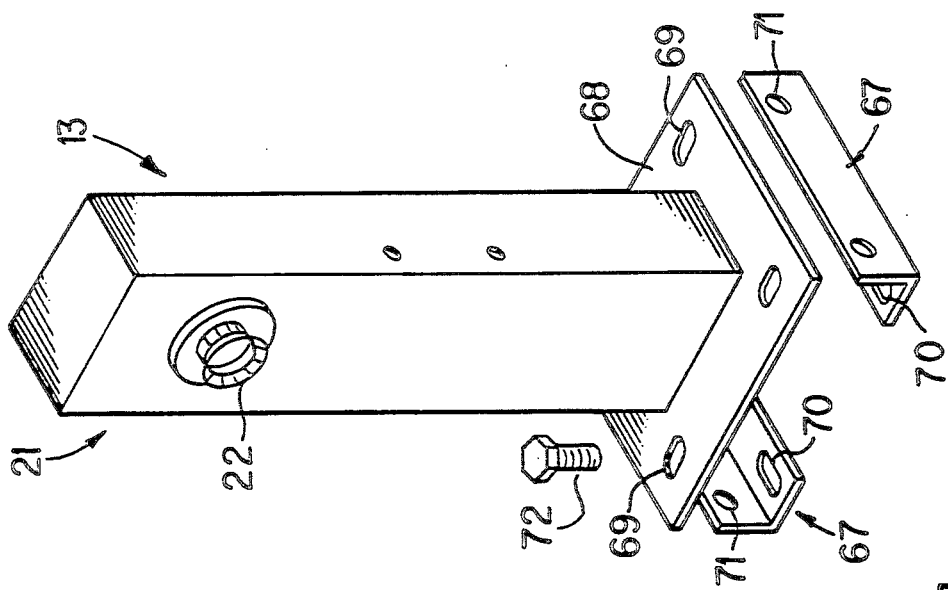
FIG. 4 is a perspective view of a preferred form of sensing head and associated mounting brackets according to the invention.
Figure 5:
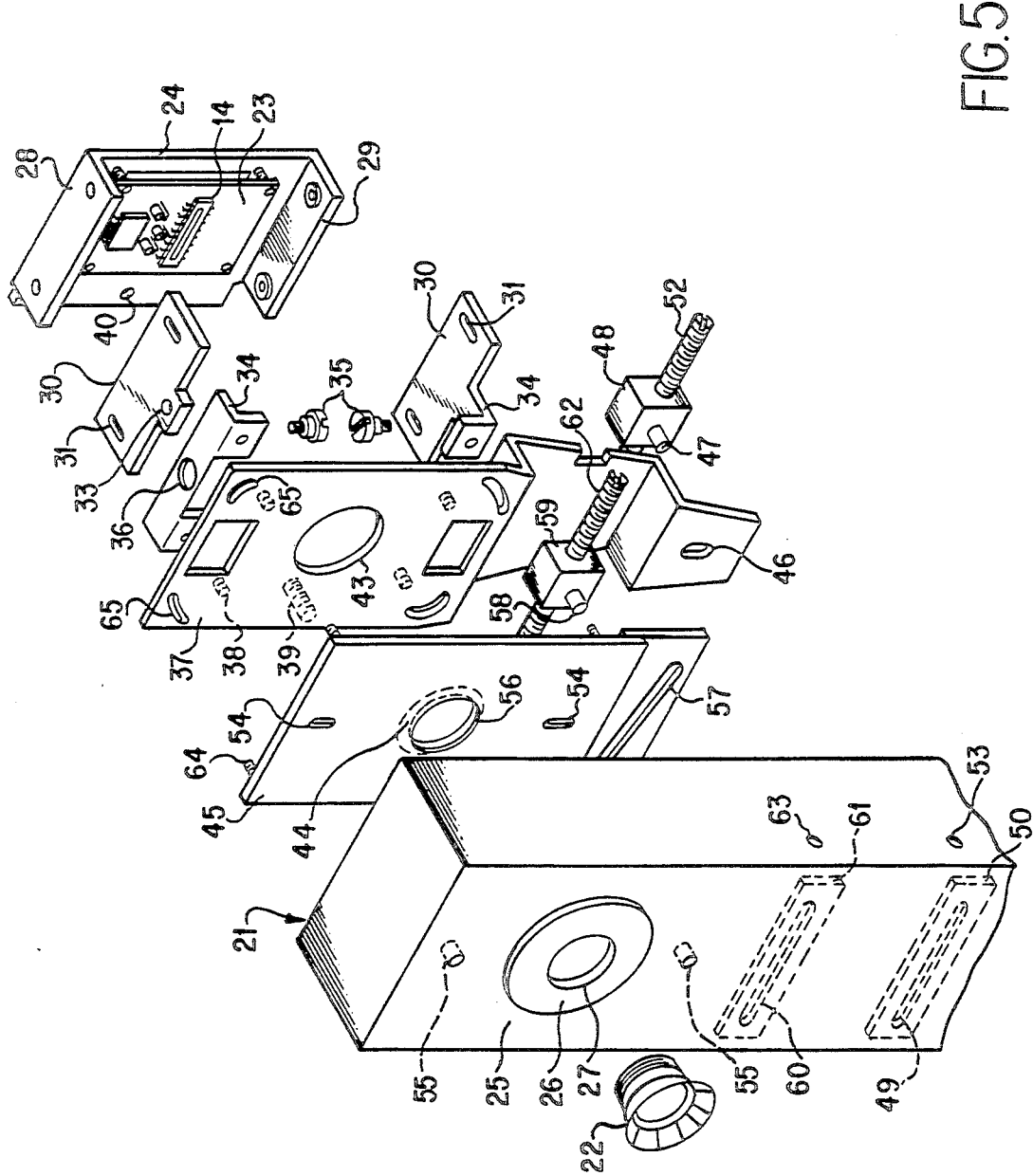
FIG. 5 is an exploded view illustrating the supporting bracket assembly for the array.

The sensing head 13 for the apparatus as shown in FIG. 4 includes a housing 21 of generally rectangular form which is supported between the lanes as shown in FIG. 1 and defines a mount for the lens 22 which receives reflected light from the pins 12 focuses then on the linear array 14 which as shown more clearly in FIG. 5 is arranged inwardly of the lens 22 and mounted on a printed circuit board 23 fixed to a mounting bracket 24. The front wall 25 of the housing 21 is provided with a raised boss 26 which is internally threaded at 27 so as to permit the lens 22 to be screw engaged therewith.

Figure 6:
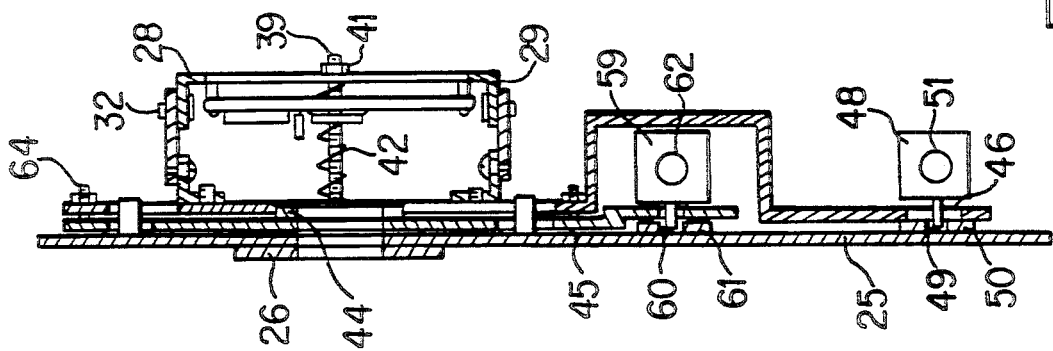
FIG. 6 illustrates the bracket assembly of FIG. 6 in sectional view.

As shown in FIGS. 5 and 6, the mounting bracket 24 includes upper and lower flanges 28 and 29, each of which is apertured for connection to upper and lower pivot plates 30, the latter being provided with elongated apertures 31 through which fasteners 32 may project for engagement with flanges 28 and 29 and which allow adjustment of the mounting bracket 24 relative to the plates 30. The pivot plates 30 also include central pivot apertures 33 which enable the plates 30 and thus the bracket 24 to be pivotally connected to upper and lower angle brackets 34 via pivot pins or screws 35, the latter being supported in bearings 36 in the respective angle brackets 34.

The upper and lower angle brackets 34 are secured to a pivotal bracket 37 via studs 38 carried by the bracket 37 so that the mounting bracket 24 is mounted for pivotal movement about a vertical axis relative to the bracket 37. The bracket 37 also includes an elongated threaded stud 39 which projects through an aperture 40 in the bracket 24 for engagement with a nut 41 and a spring 42 is arranged about the stud 39 and interposed between the brackets 24 and 37. Thus rotating the nut 41 in opposite directions will cause the bracket 24 to pivot in opposite directions relative to the bracket 37.

The bracket 37 is provided with a central bearing hole 43 which locates about a boss 44 of a further bracket 45 so that the bracket 37 may rotate relative thereto about a generally longitudinal axis. So as to enable rotational adjustment movement of the bracket 37, the bracket 37 is provided with an elongate slot 46 through which a pin 47 of an adjustment block 48 may project, the pin 47 also extending into an elongated slot 49 provided in a plate 50 secured to the rear of the front panel 25 of the housing 21. The block 48 is provided with a threaded aperture 51 to enable its threaded engagement with a screw threaded rod 52, the latter being supported for rotation on opposite side of the housing 20 by projecting through apertures 53 therein. The rod 52 however is provided with a collar (not shown) so as to prevent its detachment from the housing 21 whist permitting its rotation.

It will thus be apparent that rotation of the rod 52 in opposite directions will cause the block 48 to move along the rod 52 being guided by the slot 49 and causing rotation of the bracket 37 by virtue of the engagement of the hole 43 with the boss 44. Pivotal movement of the bracket 37 is permitted because of the elongated nature of the slot 46.

The bracket 45 is located adjacent the rear surface of the front panel 25 of the housing 21 and is provided with spaced elongated apertures 54 which locate over studs 55 projecting rearwardly from the front panel 25 of the housing 21. The bracket 45 is also centrally apertured at 56 so as to permit light from the lens 22 an image to be presented to the array 14. An inclined elongated slot 57 is provided in a lower portion of the bracket 45 for receipt of a pin 58 of a further block 59, the pin 58 also projecting into a slot 60 in a further plate 61 secured to the rear of the front panel 25.

The block 59 is also screw threadably engaged with an adjustment rod 62 in a similar manner to the block 48 and rod 52 so that rotation of the rod 62 in opposite directions will cause movement of the pin 58 along the slot 60. The inclined nature of the slot 57 will also cause the bracket 45 to be raised and lowered during this movement to provide for vertical adjustment for the array 14. The rod 62 is supported in apertures 63 in the side walls of the housing for rotation but restrained by collars from axial movement. Each rod 52 and 62 is also suitably provided with a screwdriver slot to permit ready adjustments.

The brackets 37 and 45 and held together by means of studs 64 on the bracket 45 which pass through arcuate slots 65 in the bracket 37 for engagement with nuts, this arrangement permitting limited pivotal movement of the bracket 37 relative to the bracket 45.

It will thus be seen that the stud 39 and nut 41 allow for pivotal adjustment of the array 14 about a vertical axis, the block 48 and rod 52 allow for pivotal movement of the array 14 about a horizontal axis and the block 59 and rod 62 permit adjustment of the array in a vertical direction, with each movement being relative to the lens 20.

In use the adjustment provided by the stud 39 and 42 is set up in the factory so that the lens 22 is focused correctly onto the array 14. The sensing head 13 is then positioned between the lanes and secured to opposite side members 66 (see FIG. 2) of adjacent lanes preferably using the angle brackets 67 shown in FIG. 4. The housing 21 of the sensing head 13 is provided with a base member 68 having elongated slots 69 adjacent its corners adapted for alignment with similar slots 70 in the brackets 67. The slots 70 however extend transversely of the slots 69. The brackets 67 are secured to the side members 66 via the apertures 71 and the base member 68 supported by the brackets 67 so that the sensing head 13 is suspended between the side members 66. Bolts 72 are passed through the respective overlapping elongated slots 69 and 70 and the housing 21 may then be positioned in its general preferred attitude with movement in two axes being permitted by means of the cooperating slots 69 and 70. After positioning as above, the bolts 72 may be tightened to hold the head 13 for subsequent adjustments as described below.

After positioning the sensing head 13 between the lanes 10 the LCD display 20 is connected in circuit so as to provide an image of the pins similar to that shown in FIG. 3. So as to achieve distinct peaks of reflected light the threaded rod 62 is rotated to rise or lower the bracket 45 and thus the array 14 relative to the lens 22 with the LCD display 20 being observed during this movement with the adjustment being made until distinct peaks are observed. This occurs when the array 14 receives reflected light through the lens 22 from the region of the necks of the pins.

So as to ensure that the signals received by the array 14 from the respective lanes are of substantially the same level the position of the bracket 37 may be adjusted by rotating the threaded rod 52 in opposite directions. This will serve to rock or pivot the array 14 about a horizontal axis and again the display 20 can be observed until the generated signals for each lane are substantially the same. The sensing head 13 is thus set up for operation.

Whilst the system of the invention is particularly suited to usage in sensing pins on a pair of adjacent pin decks, it may readily be applied to the sensing of pins on one pin deck only. This is achieved by varying the focal length of the lens and making changes to the software so that only one lane is interpreted.

The sensing head 13 may be placed in any suitable position where a field of view encompassing both lanes can be established for example on the bowling lane capping between the bowling lanes. Where however only one lane is to be scanned, the sensing head may be located behind the pinspotter ball return.

Whilst the system of the invention is particularly suited to the sensing of standing ten pins in ten pin bowling apparatus, it may also be readily applied the presence or absence of objects in other situations such as in work process operations. In the system of the invention, it will be apparent that at no time is the reflected signal converted into a video signal but rather is directly processed by the microcontroller driving the array directly. The sensing head 13 may however be used with other pin sensing circuitry where adjustment of the array is required.

The bracket arrangement for supporting the array 14 relative to the lens 22 may be considerably varied in configuration whilst achieving the desired adjustments as described.

All modifications and variations to the invention as would be apparent to persons skilled in the art are deemed to fall within the broad scope and ambit of the invention as defined in the appended claims.

I claim:

1. A detection system for sensing standing pins in a bowling apparatus of the type including a bowling lane and a pin deck at the end of the lane for supporting pins thereon comprising:
   a sensing head;
   said sensing head including a housing;
   lens means supported on said housing for receiving light reflected from the standing pins;
   a linear array of photosensitive devices disposed within said housing rearwardly of said lens means to receive said reflected light through said lens means, said array providing a serial output corresponding to the level of light reflected from said standing pins, which in turn is dependent upon the presence or absence of one or more pins in the field of view of said lens means;

bracket means supporting said linear array; and
means for moving said bracket means, whereby to premit variation of the position of said array relative to said lens means to thereby vary the incidence of reflected light on said array.

2. A detention system according to claim 1 wherein said bracket means supports said linear array for selectively adjustable movement in a substantially vertical direction and pivotal movement about a substantially horizontal axis.

3. A detection system according to claim 2 wherein said bracket means further supports said linear array for selective pivotal movement about a substantially vertical axis.

4. A detection system according to claim 2 wherein said bracket means includes:
- a first bracket supported in said housing for movement in a substantially vertical direction; and
- a second bracket pivotally supported on said first bracket for pivotal movement about a substantially horizontal axis and wherein said linear array is mounted on said second bracket.

5. A detection system according to claim 4 wherein said first and second brackets are provided with aligned apertures to permit the passage of light therethrough from said lens means to said array.

6. A detection system according to claim 5 wherein, said aperture in said first bracket is surrounded by a boss; and
said aperture in said second bracket is in bearing engagement with said boss whereby, to define said pivotal support of said second bracket on said first bracket.

7. A detection system for sensing standing pins in a bowling apparatus of the type including a bowling lane and a pin deck at the end of said lane for supporting pins thereon comprising:
- a sensing head, said sensing head including lens means for receiving light reflected from the standing pins;
- a linear array of photosensitive devices, said array providing a serial output corresponding to the level of light reflected from the standing pins, which in turn is dependent upon the presence or absence of one or more pins in the field of view of said lens means;
- means for supporting said linear array rearwardly of said lens means so that said linear array receives said reflected light through said lens means;
- said supporting means including first means supported for vertical adjustable movement, and second means supported on said first means for pivotal movement about a substantially horizontal axis;
- said linear array being mounted on said second means; and
- actuator means selectively operable to cause vertical movement of said first means and pivotal movement of said second means whereby to vary position of said array relative to said lens means and thereby the incidence of reflected light on said array.

8. A detection system according to claim 7 wherein said first means and second means are provided with aligned apertures for the passage of light from said lens means to said array.

9. A detection system according to claim 8 wherein said horizontal axis is aligned with said apertures.

10. A detection system according to claim 7 and including third means mounted to said second means for pivotal movement about a substantially vertical axis and wherein said array is fixedly mounted to said third means.

11. A detection system according to claim 7, wherein said actuator means comprises first and second selectively operable actuators connected to said first and second means respectively.

12. A detection system according to claim 7 and including microcontroller means connected to said array, said microcontroller means providing a serial digital output representative of said reflected light received by said array and thus the number of pins standing on said pin deck.

13. A detection system according to claim 12 wherein said microcontroller means is triggered to interpret standing pins on said pin deck in response to switch means which is actuable consequent upon a ball being bowled down said bowling lane.

14. A detection system according to claim 7 wherein said lens means has a field of view sufficient to extend to all standing pins on a pair of adjacent bowling lanes.

15. A detection system according to claim 12 and including display means associated with said microcontroller means for providing a visual display representative of said reflective light received by said array.

16. A detective system for sensing standing pins in a bowling apparatus of the type including a bowling lane and a pin deck at the end of said lane for supporting pins thereon comprising:
- a sensing head;
- said sensing head including a housing having a front wall;
- lens means supported on said front wall for receiving light reflected from the standing pins;
- a linear array of photosensitive devices supported in said housing rearwardly of said front wall to receive said reflected light through said lens means, said array providing a serial output corresponding to the level of light reflected from the standing pins, which in turn is dependent upon the presence or absence of one or more pins in the field of view of said lens means;
- bracket means for supporting said linear array for movement is said housing;
- said bracket means including a first bracket and a second bracket;
- means for supporting said first bracket in said housing for movement in a substantially vertical direction;
- means for pivotally supporting said second bracket on said first bracket for pivotal movement about a substantially horizontal axis, said linear array being mounted on said second bracket; and
- means selectively actuable for causing said vertical movement of said first bracket and pivotal movement of said second bracket whereby to vary the position of said linear array relative to said lens means to thereby vary the incidence of light on said array.

17. A detection system according to claim 16 wherein said first bracket includes an inclined slot and wherein said selectively actuable means includes a member located in said slot and means for moving said member transversely of said slot to cause said vertical movement of said first bracket.

18. A detection system according to claim 17 wherein said member is guided for movement along a threaded member, rotatable movement of said threaded member in opposite directions caused movement of said member in opposite direction.

19. A detection system according to claim 16 wherein said linear array is mounted on said second bracket via a third bracket, said third bracket being supported on said second bracket for pivotal movement about a substantially vertical axes.

* * * * *